C. L. POOL.
BOILER STAY BOLT.
APPLICATION FILED FEB. 21, 1916.
1,191,729.
Patented July 18, 1916.
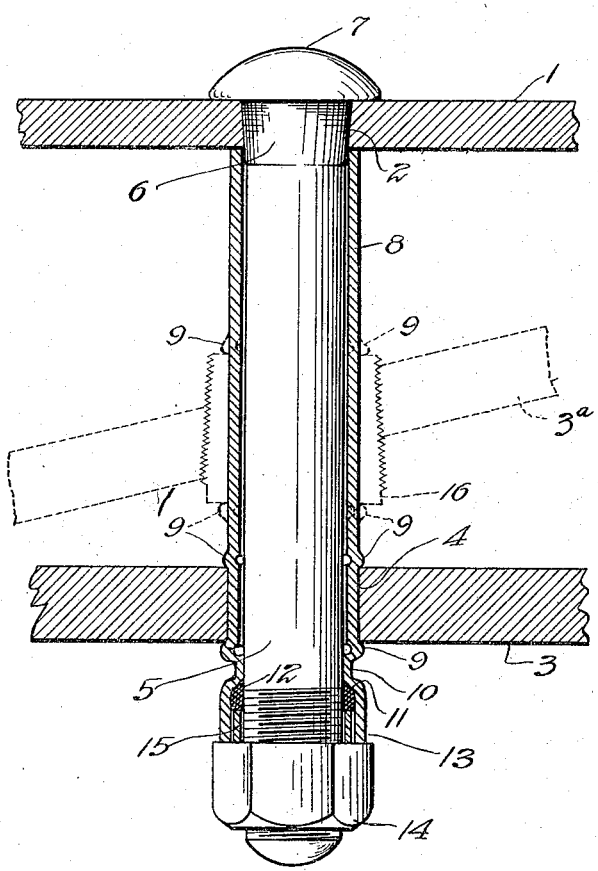
Witness
J. Gordon Sparkes
Inventor
Charlie L. Pool
By
Attorney

UNITED STATES PATENT OFFICE.

CHARLIE L. POOL, OF BIRMINGHAM, ALABAMA.

BOILER STAY-BOLT.

1,191,729.  Specification of Letters Patent.  Patented July 18, 1916.

Application filed February 21, 1916. Serial No. 79,658.

*To all whom it may concern:*

Be it known that I, CHARLIE L. POOL, a citizen of the United States of America, residing at Birmingham, in the county of Jefferson and State of Alabama, have invented certain new and useful Improvements in Boiler Stay-Bolts, of which the following is a specification.

My invention relates to boiler stay bolts and contemplates the use of a bolt having a taper shoulder driven through a taper hole in the inner sheet and a tube surrounding the bolt and bearing against the inner face of the inside sheet and projecting through and beyond the outside sheet into which it is expanded to give it a tight fit in the latter sheet. The threaded end of the bolt projects beyond the outer end of the tube and receives a nut which is screwed against the tube and serves to hold in place a packing which surrounds the bolt near the open end of the tube. This general arrangement provides for many advantages in the application, service, and testing of stay bolts which will be hereinafter more particularly pointed out.

As illustrative of the preferred embodiment of my invention, reference is made to the accompanying drawings in which a boiler section is shown with the tube in longitudinal section and the stay bolt in elevation.

The inner sheet 1 of the boiler is provided with a taper hole 2 therethrough and the outer sheet 3 is provided with a straight hole 4, these holes standing in axial alinement. A stay bolt 5 having a long slightly tapering shoulder 6 and a bolt head 7 is inserted through the inner sheet 1 and its taper shoulder driven with a steam tight wedge fit in the opening 2. A tube 8 is inserted through the hole 4 in the outer sheet and caused to engage the inner sheet. The tube 8 is expanded into the hole 4 so as to form a tight joint and on both sides of the outer sheet it is expanded or enlarged to form beads 9. The outer end of the tubing which extends beyond the lagging (not shown) is drawn in at 10 to fit snugly about the bolt and to form a seat 11 for the packing ring 12. This packing is interposed between an unthreaded portion of the bolt and the outer end of the tube which is expanded at 13 to form a stuffing box to receive the packing. The bolt is provided with standard threads and adapted to receive a nut 14. A gland 15 is slipped on ahead of the nut so that as the bolt is screwed home this gland will engage and force the packing 12 against seat 11 to make a tight joint between the tube and the bolt. The bead 9 on the tube serves to increase the strength of the joint between the tube and the outer sheet. It will be noted that the taper shoulder 2 on the bolt projects through the inner sheet and into the inner end of the tube, thus serving to reduce the clearance between the bolt and the tube at the inner end of the latter and thereby to reduce the tendency to leakage should the bolt break and the inner sheet give. The bolt preferably has sufficient clearance in the tube to avoid becoming rusted and fast therein.

I have indicated a crown sheet 3ª in dotted lines showing how the same length of bolt and tube could be applied to the crown sheet. Here in accordance with the general practice a plug 16 is screwed through the crown sheet and the tube is expanded into the plug and provided with the beads 9 as has already been described. When a bolt and tube of this length are used the bolt will have very great flexibility.

The advantages of my principal arrangement may be briefly described as follows:— The inner sheet will be clamped and securely held between the bolt head and the tube, thus preventing the sheet from cracking or wearing under conditions of service with bad water and from cracking when contracting and expanding under intense heat. The wedge shaped fit between the shoulder on the bolt and the taper opening in the inner sheet will avoid any expensive machine work in applying the bolts and enable me to fit the bolt in the hole with an ordinary taper reamer.

The tube 8, being held in position between the inner and outer sheets and having no holes therein, will prevent water from running out through the holes in the sheets when a bolt is broken so that a new bolt can be applied with water in the boiler. Since the tube extends from the inside of the inner sheet through and beyond the outer sheet and the bolt is directly connected only to the inner sheet and to the free outer end the bolt has much more flexibility than when rigidly applied to both sheets in accordance with the present general practice and thus I prevent the breaking of the bolts which so frequently occurs. The packing in the stuffing box at the outer end of the tube will prevent leaking until the bolt breaks and the inner sheet gives, in which event the end of the bolt and the packing will fall off and the steam will leak from the inner end of the tube through the tube and pass off through its open end, thus indicating trouble at that point. At the seat of the packing however it will be noted that the tube fits close enough around the bolt to prevent the steam blowing hard enough to stop the engine. Under such conditions the bolt will remain in the hole because there is no pressure on the outer end of the bolt and its taper shoulder and head will hold it securely in the inner sheet.

The bolt is what I term "self testing", as it requires only the hammer test which can be made either on the inner or outer sheet. By expanding the tube in the outer sheet, I do not require a close fitting or expensive machine work other than a drill to make the hole and a tool to expand the tube therein.

My stay bolt will not require any tell-tale holes in the outer end to be kept open in accordance with the Federal requirement and no cap is required to be removed at the outer end for inspection. The bolts will extend through the lagging and it will therefore be unnecessary to remove the lagging for inspection on the outer ends of the bolt.

My stay bolt can be applied in all parts of the boiler, in the side sheet, door sheet, crown sheet and flue sheet, and the same length bolt and tube can be applied in holes varying as much as four inches in length, due to the fact that the tube, having its intermediate portion of uniform diameter, can be expanded into the outer sheet or a plug therein at whatever point it comes on the tube and without reference to its relative position to the nut.

Having thus described the preferred embodiment of my invention and its advantages, what I claim as new and desire to secure by Letters Patent, is:—

1. The combination with inner and outer boiler sheets, of a stay bolt therefor, a tube surrounding the bolt and adapted to engage the inside of the inner sheet and have its inner end closed thereby and to project through and beyond the outer sheet, said tube being free of perforations and having its inner end adapted to be expanded into the outer sheet wherever the latter happens to come on the tube, a nut on the threaded end of the bolt which projects from the outer open end of the tube, and means to pack the joint between the tube and bolt.

2. In combination, boiler sheets, a stay bolt therefor having threads at one end and having a head and an adjoining taper shoulder at the outer end, said shoulder being adapted to be driven with a steam tight fit through the inner boiler sheet, a tube adapted to fit over the bolt and to extend from opposite the taper shoulder to a point near the threaded bolt end, said tube being adapted to be expanded at an intermediate point into the outer sheet and to abut at its inner end against the inside of the inner sheet, a nut adapted to be screwed on the threaded end of the bolt, and a packing gland between the tube, bolt and nut.

3. The combination with inner and outer boiler sheets, of a stay bolt having a head and a slightly tapering shoulder at its inner end, there being a taper opening extending through the inner sheet to receive said taper shoulder with a steam tight fit, a tube surrounding the bolt and engaging the inside wall of the inner sheet, there being a straight opening in the outer sheet through which said tube passes and into which an intermediate portion of the tube is expanded, a nut adapted to screw on an end of the bolt, a gland held by the nut and received between the bolt and tube, and packing means co-acting with the gland to pack the joint between the bolt and tube.

4. In combination, a stay bolt and a tube loosely surrounding the bolt, said tube having its end adjacent to the threaded end of the bolt expanded to receive packing, a nut screwed on the bolt, a packing gland held by said nut and disposed in the expanded end of said tube, and a packing ring engaged by the gland and adapted to pack the joint between the tube and bolt.

5. The combination with the inner and outer sheets of a boiler, there being alining openings in said sheets, of a bolt passed entirely through both openings and having its head engaging the outer side of the inner sheet, a taper shoulder on the bolt which is driven through the inner sheet and projects into the boiler space, a tube engaging the inside of said inner sheet and loosely surrounding the bolt and projecting through the opening in the outer sheet and being expanded thereinto, the inner end of said tube being substantially closed by said taper shoulder on the bolt which projects thereinto, the outer end of the tube being drawn in to snugly engage the bolt, and a nut on the bolt adapted to engage said outer end of the tube and tie the sheets together.

6. The combination with the inner and outer sheets of a boiler having alining openings, one of which is tapered throughout and the other of which is of larger diameter than the smaller diameter of the tapered opening, a bolt having a head and taper shoulder at one end and threads at its other end, the taper shoulder being adapted to be driven with a steam tight fit into the taper opening while the other end of the bolt passes through the other opening, a tube open only at its ends and disposed to loosely surround the bolt, said tube being inserted through and expanded into the larger opening with its inner end abutting against the inner sheet, the outer end of said tube being first expanded to form a bead to engage the outer face of the outer sheet and then drawn in to fit snugly about the bolt and present an inside packing seat which is opposite an unthreaded part of the bolt, a nut screwed on the outer threaded end of the bolt, a packing ring seated on said packing seat in the tube, and a gland movable with the nut and adapted to engage said packing and form a pressure tight joint between the tube and bolt, substantially as described.

7. The combination with the inner and outer sheets of a boiler having alining openings, one of which is tapered and the other of which is of larger diameter than the smaller diameter of the tapered opening, a bolt having a head and taper shoulder at one end, the taper shoulder being adapted to fit through the taper opening while the other end of the bolt passes through the other opening, a tube surrounding the bolt and inserted through the larger opening with its inner end abutting against the sheet with the taper opening, the tube being expanded in the larger opening so that its inner end connects with the head of the bolt to clamp between them the inner sheet, the outer end of said tube being first expanded to form a bead on each side of the outer sheet, then contracted beyond the outer bead to fit snugly about the bolt and then again expanded to form a stuffing box, a nut screwed on the outer end of the bolt, a packing ring in said box, and a gland movable with the nut and adapted to engage said packing and form a pressure tight joint between the tube and bolt when the nut engages the open end of the tube, substantially as described.

8. The combination with the inner and outer sheets of a boiler, of a tube closed except at its ends, one of which abuts against and is closed by the inner wall of the inside sheet and the other of which projects through and substantially beyond the outer sheet, said tube being of uniform size throughout its intermediate portion and adapted to be expanded into the outer sheet wherever the same may come on the tube, a bolt inserted steam tight through the inner sheet and loosely through the tube and outer sheet, a nut screwed on the bolt and adapted to engage the tube and hold the sheets together, a taper shoulder on the bolt which makes a close fit in the inner end of the tube to throttle the latter, and means to pack the joint between the outer end of the tube and bolt.

In testimony whereof I affix my signature.

CHARLIE L. POOL.

Witness:
NOMIE WELSH.

Copies of this patent may be obtained for five cents each, by addressing the "Commissioner of Patents, Washington, D. C."